United States Patent [19]
Nakano et al.

[11] Patent Number: 5,194,976
[45] Date of Patent: Mar. 16, 1993

[54] LIQUID CRYSTAL DISPLAY DEVICE AND METHOD OF MANUFACTURING THE SAME

[75] Inventors: Minoru Nakano; Toshiaki Niitsu, both of Hachioji, Japan

[73] Assignee: Casio Computer Co., Ltd., Tokyo, Japan

[21] Appl. No.: 556,910

[22] Filed: Jul. 23, 1990

[30] Foreign Application Priority Data

Jul. 25, 1989 [JP] Japan ................................ 1-87300[U]
Dec. 28, 1989 [JP] Japan ................................ 1-341247
Dec. 28, 1989 [JP] Japan ................................ 1-341248
Feb. 27, 1990 [JP] Japan ................................ 2-44570

[51] Int. Cl.$^5$ .............................................. G02F 4/43
[52] U.S. Cl. ........................................ 359/79; 359/68; 359/75
[58] Field of Search ............... 350/334, 339 F, 339 R; 428/1; 359/68, 75, 79; 430/14, 20

[56] References Cited

U.S. PATENT DOCUMENTS

| | | | |
|---|---|---|---|
| 4,636,038 | 1/1987 | Kitahara et al. | 359/79 |
| 4,744,637 | 5/1988 | Sekimura et al. | 350/339 R |
| 4,779,957 | 10/1988 | Suginoya et al. | 359/79 |
| 4,853,296 | 8/1989 | Fukuyoshi | 359/68 |
| 4,917,471 | 4/1990 | Takao et al. | 350/339 F |
| 4,929,060 | 5/1990 | Sugimoto et al. | 350/339 F |
| 4,935,757 | 6/1990 | Hatano et al. | 359/68 |

FOREIGN PATENT DOCUMENTS

| | | |
|---|---|---|
| 58-171023 | 10/1983 | Japan . |
| 62-163017 | 7/1987 | Japan . |
| 0250416 | 10/1987 | Japan .................. 350/339 F |
| 0068812 | 3/1988 | Japan .................. 350/339 F |
| 0129321 | 6/1988 | Japan .................. 350/339 F |
| 0241522 | 10/1988 | Japan .................. 350/339 F |
| 1-121820 | 5/1989 | Japan . |
| 1140186 | 6/1989 | Japan .................. 350/339 F |
| 8702508 | 10/1987 | Netherlands . |

Primary Examiner—Rolf Hille
Assistant Examiner—Tan Ho
Attorney, Agent, or Firm—Frishauf, Holtz, Goodman & Woodward

[57] ABSTRACT

A liquid crystal display device according to the invention includes a pair of substrates arranged to be oppose to each other, electrodes mounted on the opposing surfaces of the paired substrates, a thin film member such as color filters mounted on one of the paired substrates, a protective film covering the thin film member, a sealing member for hermetically binding the paired substrates each other with a predetermined gap interposed therebetween, and a liquid crystal material filled in an area of the gas surrounded by the sealing member between the paired substrates. The protective film has a multiple layer structure composed of a plurality of insulation layers made of a same film material. The insulation layers are formed not to overlap their outer peripheral end portions.

16 Claims, 12 Drawing Sheets

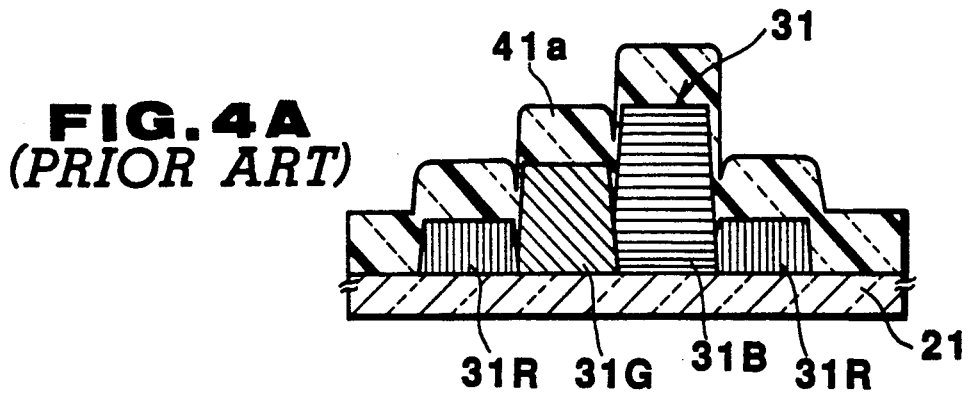
FIG. 4A
*(PRIOR ART)*
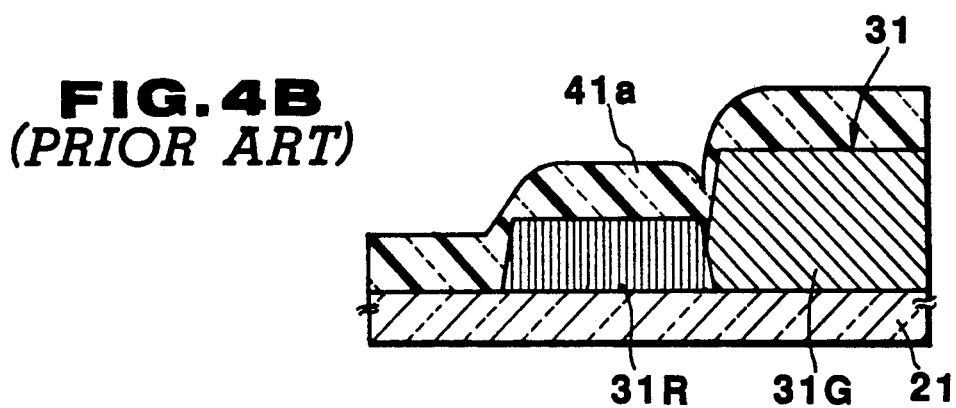
FIG. 4B
*(PRIOR ART)*
FIG. 3
*(PRIOR ART)*
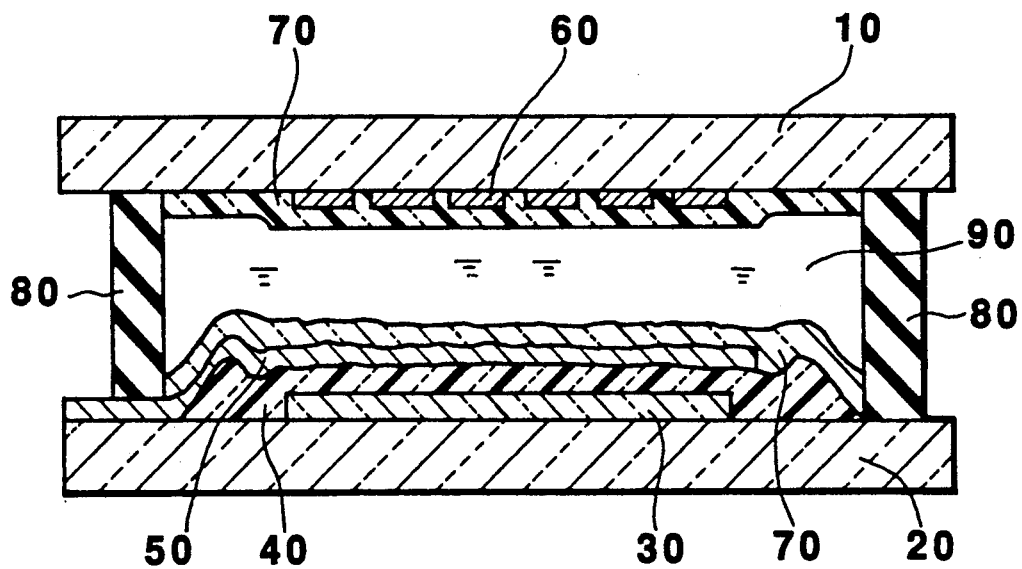

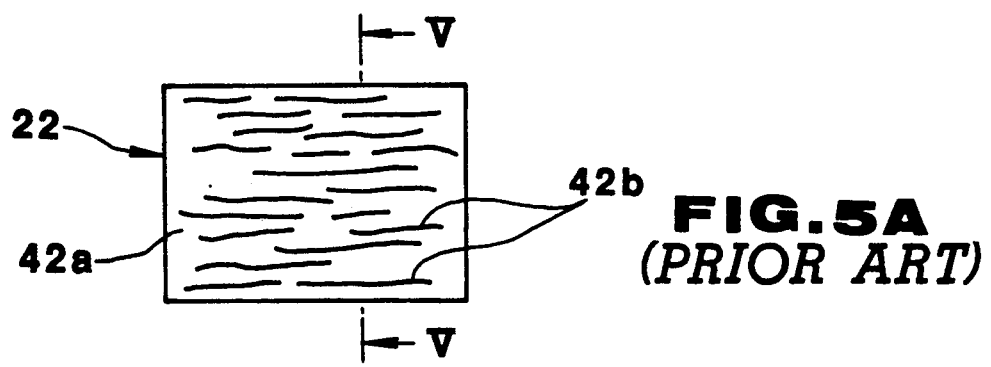
FIG. 5A
*(PRIOR ART)*
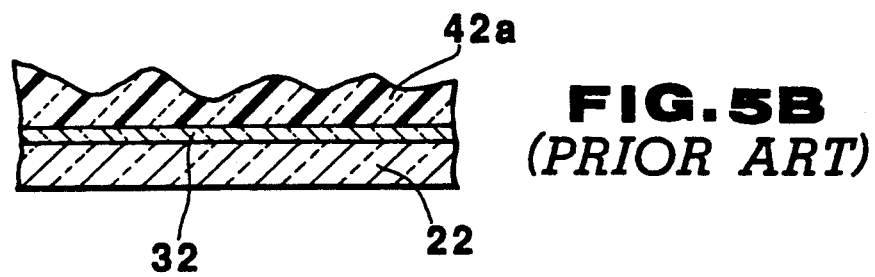
FIG. 5B
*(PRIOR ART)*
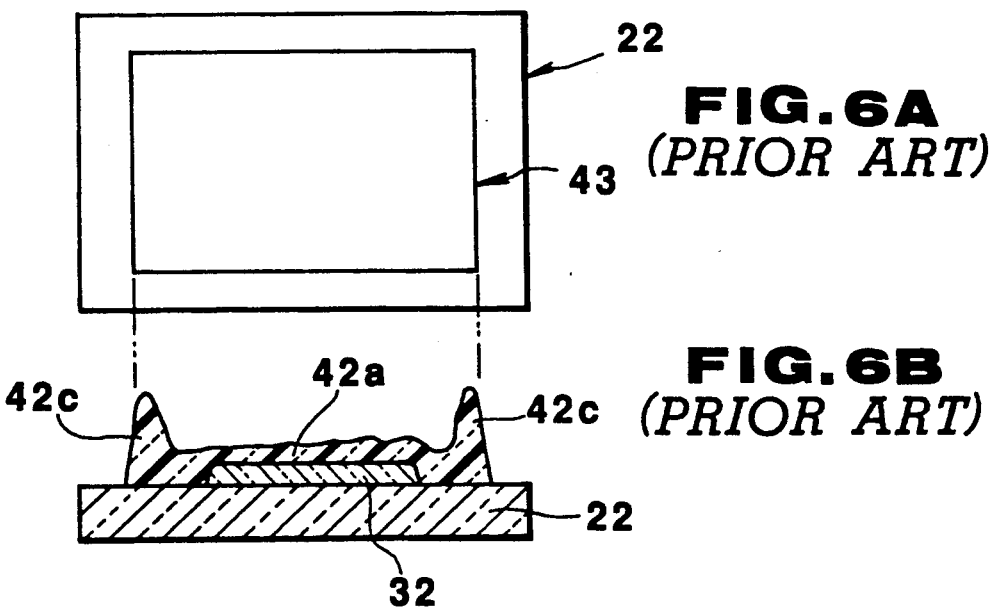
FIG. 6A
*(PRIOR ART)*
FIG. 6B
*(PRIOR ART)*

LIQUID CRYSTAL DISPLAY DEVICE AND METHOD OF MANUFACTURING THE SAME

BACKGROUND OF THE INVENTION

1. Field of the Invention

This invention relates to a liquid crystal display device provided with a plurality of insulation layers and a method of manufacturing the same.

2. Description of the Related Art

A conventional liquid crystal display device to be used for a television set or other visual image display applications normally comprises a pair of substrates arranged to oppose each other with a liquid crystal layer interposed therebetween. A plurality of striped display electrodes are formed on the opposing surface of each substrate, and the extending direction of the striped electrodes on one substrate is substantially perpendicular to that of the striped electrodes on the other substrate. A plurality of areas of the liquid crystal layer, which correspond to the opposing portions of one and the other striped electrodes, are used as a plurality of imaging elements, which are controlled by one and the other striped electrodes so as to display an image on the display device.

At least one of the two groups of the striped display electrodes is formed on an insulation film formed on the opposing surface of the substrate corresponding thereto. In a conventional color liquid crystal display device, for instance, a color filter made of thin film of an insulation material is formed on the opposing surface of one substrate, and one group of the striped display electrodes are formed on the color filter. Another type of the color liquid crystal display device, in which a plurality of striped electrodes are firstly formed on the opposing surface of one substrate and then a color filter is formed on the electrodes, is also known. In this color display device, a driving voltage applied to the striped electrodes on the opposing surface of the above described one substrate is dropped until the voltage reaches at the liquid crystal layer though the color filter. Therefore, in the latter color liquid crystal display device, the driving voltage to be applied to the electrodes must be higher than that of the former color liquid crystal display device, as much as the drops of the voltage in the color filter.

FIG. 1 shows a conventional liquid crystal display device, in which a color filter is formed on the opposing surface of one substrate and striped electrodes are formed on the color filter; In the drawing, reference numbers 1 and 2 respectively denote the upper and lower ones of a pair of transparent substrates made of glass. On the opposing surface of one of the substrates 1 and 2 (the lower one in FIG. 1), a plurality of striped red color filters 3R, a plurality of striped green color filters 3G, and a plurality of striped blue color filters 3B are formed to be arranged alternately and in parallel with each other. These color filters 3R, 3G and 3B are covered by a protective film 4 made of transparent resin such as polyimide and formed on the opposing surface of the substrate 2, and a plurality of display electrodes (transparent electrodes made of indium-tin-oxide (ITO), for example) 5 are formed to be striped on the protective film 4. It should be noted that the protective film 4 is not formed on the peripheral area of the opposing surface of the substrate 2.

Terminals 5a of the striped electrodes 5 are arranged in the peripheral area of the opposing surface of the substrate 2 that is not covered with the protective film 4, because the ITO electrodes as a material for the electrodes does not have a good adherence to the protective film 4 made of polyimide resin for example. Therefore, if the terminals 5a of the electrodes 5 are formed on the protective film 4, the terminals 5 will be easily separated from the protective film 4. On the contrary, if the terminals 5a are directly formed on the opposing surface of the substrate 2, the terminals 5a of the electrodes 5 will not separate from the substrate 2 because the material for the electrodes 5, such as ITO, has a good adherence to the substrate 2 made of glass.

On the opposing surface of the other substrate 1 (the upper substrate in FIG. 1) a plurality of striped display electrodes (electrodes made of a transparent material such as ITO) 6 are formed, and the extending direction of the striped display electrodes 6 are perpendicular to that of the striped display electrodes 5 on the above described one substrate 2. The above described one striped electrodes 5 are used as scanning electrodes (common electrodes) and the other striped electrodes 6 are used as signal electrodes (segment electrodes). Both the striped electrodes 6 on the opposing surface of the upper substrate 1 and the striped electrodes 5 on the opposing surface of the lower substrate 2 are respectively covered by aligning films 7, 7 formed on the opposing surfaces. The substrates 1 and 2 are indirectly bonded through a frame-shaped sealing member 8 interposed between the peripheral areas of the opposing surfaces thereof, and a space surrounded by the sealing member 8 between the substrates 1, 2 is filled with liquid crystal material 9.

The protective film 4 is firstly formed as a whole surface covering film 4a covering the whole opposing surface of the substrate, as shown in FIG. 2A, by applying a transparent resin material such as polyimide through a spin-coat method to the whole opposing surface of the substrate 2, on which the color filters 3R, 3G and 3B are formed, to make a thick film layer and then baking the thick film layer. The whole surface covering film 4a is etched at its peripheral area to be removed away to have a predetermined configuration for the protective film 4, as illustrated in FIG. 2B.

Alternatively, the protective film 4 can be formed by a technique similar to offset print. With this technique, a projecting pattern identical with that of the protective film is formed on the peripheral surface of a printing drum. Then, after the material of the protective film is evenly applied on the projecting pattern, the drum is rotated with the projecting pattern being pressed on the opposing surface of the substrate, so that the material of the protective film, having the same shape as that of the projecting pattern, is applied on the opposing surface of the substrate. The applied film is predried and then heated to be hardened to the form a protective film.

FIG. 3 shows a liquid crystal display device having a protective film formed on a substrate 20 by the above described technique similar to offset print. In FIG. 3, on an opposing surface of the lower substrate 20 color filters 30 including red, green and blue ones are formed, and further a protective film 40 is formed thereon to cover the color filters 30. Display electrodes 50 are formed on the protective film 40, and an aligning film 70 is further formed on the electrodes 50. On the opposing surface of the upper substrate 10 a plurality of striped display electrodes 60 are formed, and on the electrodes 60 an aligning film 70 is formed. The lower substrate 20 and the upper substrate 10 are bonded through a sealing member 80 interposed therebetween, and a space surrounded by the sealing member 80 between the upper and lower substrates 10 and 20 is filled with a liquid crystal material 90.

The two conventional liquid crystal display devices as illustrated in FIGS. 1 to 2B, and 3 has a drawback that the thickness of the protective film 4 or 40 at the edge portion of the color filter 3 or 30 is thin, because the material of the protective film still having a fluidity flows down from higher to lower regions on the lower substrate 2 or 20 while it is in the preliminary drying process after it has been applied onto the color filters 3 or 30 on the lower substrate 2 or 20 by means of the spin-coat technique or printing technique as described above.

Particularly, in a liquid crystal color display device having color filters 31 various color filters of which have different thickness, the liquid crystal material changing its thickness at its various points, as illustrated in FIGS. 4A and 4B, in order to control an intensity of transmitted light passing through the color filters and hence improve the color balance in the whole area of the filter 31, the material 41a of the protective film which has not hardened yet flows down from higher to lower regions on the lower substrate 21 so that the thickness of the material 41a applied on the substrate 21 becomes thin at the edge portions of the color filters 31R, 31G and 31B formed on the lower substrate 21.

A protective film material having high viscosity may be used in order to eliminate the above described drawback, but such high viscous material injures the flatness of the surface of protective film as described later.

Moreover, in the conventional liquid crystal display devices as described above, the outer peripheral end surface of the protective film 4 or 40 formed on the substrate 2 or 20 to cover the color filters 3 or 30 is a steep slope, and the protective film 4 or 40 has an enough thickness to effectively cover the color filters 3 or 30 formed on the opposing surface of the substrate 2 or 20. Therefore, the terminals of the display electrodes 5 or 50 formed to extend from the upper surface of the protective film 4 or 40 to the outer peripheral portion of the opposing surface of the substrate 2 or 20 are tend to be broken at the steeply inclined outer peripheral end surface.

The reason why the terminals are tend to be broken is because the electrodes 5 or 50 are formed of a transparent conductive material such as ITO by means of spattering technique. Since such a conductive material for the electrodes 5 or 50 can hardly be deposited by the spattering technique on the outer peripheral end surface of the protective film 4 or 40 which is the steep slope and has a big height, the thickness of the conductive material is extremely reduced at the outer peripheral end surface. Therefore, when electrodes 5 or 50 are formed by patterning the above described conductive layer by means of photolithography technique, thin height portions of the transparent electrodes 5 or 50 which are arranged at the outer peripheral end surface of the protective film 4 or 40 to form terminal members are broken.

Besides, in the above described conventional liquid crystal display device, since the lower substrate 2 or 20, the color filters 3 or 30, the protective film 4 or 40 and the display electrodes 5 or 50 formed on the protective film have different thermal expansion coefficients, the stress, generated within the protective film 4 or 40 due to the difference of thermal expansion coefficients during a heat treatment process after the formation of the display electrodes 5 or 50, will concentrate in the thin thickness portion of the protective film and produce cracks in that portion. Such cracks are one of causes to break the display electrodes 5 or 50 formed on the protective film 4 or 40.

Furthermore, if a printing technique as shown in FIG. 3 is used to form a protective film by using a highly viscous protective film material, undulation 42b is formed on the surface of the whole surface protective film 42a printed on the lower substrate 22 to cover its entire opposing surface, as illustrated in FIGS. 5A and 5B. The undulation 42b remains after the whole surface protective film 42a is preliminary heated and then shaped as the protective film 42, so that the undulation 42b causes the thickness of the liquid crystal layer to be uneven in the finally formed liquid crystal display device. The uneven thickness of the liquid crystal layer causes the intensity of the transmitted light to be varied, so that the undulation 42b is appeared on the display of the display device.

In a case that the protective film material is applied on the opposing surface of the substrate by the above described printing technique, if a printing drum 43 having a projecting pattern as shown in FIG. 6A is used, a wall 42c is formed on the outer peripheral portion of the whole surface protective film 42a (the peripheral area of the end surface of the projecting pattern of the printing drum 43), as shown in FIG. 6B. The height of the wall 42c is approximately proportional to the thickness of the whole surface protective film 42a, so that as the thickness of the film is thicker as the height of the wall 42c is greater.

SUMMARY OF THE INVENTION

In view of the above problems, it is therefore the object of the present invention is to provide a liquid crystal display device including an insulation film which has a good flatness and is free from cracks so that any breakage of the electrodes formed on the insulation film can be effectively prevented, and to provide a method of manufacturing such a liquid crystal display device.

In order to achieve the above described object, a liquid crystal display device of this invention comprises:

a pair of substrates so as to be arranged to oppose each other;

at least one first electrode mounted on the opposing surface of one of the substrates;

second electrodes mounted on the opposing surface of the other substrate so as to be opposed to the first electrode;

a thin film member mounted on the opposing surface of the other substrate opposing the above described first substrate;

an insulating film formed above a predetermined area of the opposing surface of the other substrate to cover the thin film member, and having a plurality of insulating layers formed by sequentially laminating a same film forming material;

a liquid crystal material interposed between the first and second electrodes; and a sealing member for hermetically binding the paired substrates each other with a predetermined gap interposed therebetween.

The manufacturing method according to the present invention comprises:

a first step for forming at least one first electrode on a first substrate and forming an aligning film to cover the first electrode;

a second step for forming a thin film member on a second substrate;

a third step for forming an insulating film having a plurality of insulating layers by sequentially laminating a same film material above the second substrate, on which the thin film member is formed, to cover the thin film member;

a fourth step for forming second electrodes and an aligning film on the second substrate on which the insulating film is formed, the second electrodes being opposed to the first electrodes and the aligning film being covering the second electrodes; and a fifth step for hermetically binding the first and second substrates each other with a predetermined gap interposed therebetween by means of a sealing member, and filling a liquid crystal material in the predetermined gap.

A liquid crystal display device according to this invention is provided with an insulating film in which a plurality of thin protective layers are laminated by repeating the process of applying a same protective film material to form a thin layer and subsequently baking the layer. This insulating film is not made of a highly viscous material and is thick at any points thereof. Therefore, the flatness of the surface of this insulating film is good, and a portion of the insulating film which covers the edges of the color filters can have a large thickness while the production of cracks can be effectively prevented. Moreover, the insulating film can be made further hard by adding a silicon compound into the protective layer material, so that the production of the cracks can be more effectively prevented.

Since the insulating film is constructed by sequentially laminating a plurality of insulating layers, the inclination of the outer peripheral end surface of the insulating film is gentle, and the flatness of the surface of the insulating film located near to the outer peripheral end surface is improved. Therefore, a thin film of an electrically conductive film formed on the insulating film can be enoughly deposited even on the outer peripheral end surface of the insulating film, so that the display electrodes formed by patterning the thin film of the electrically conductive film are practically free from breakage in the outer peripheral end surface of the insulating film.

According to the method of manufacturing a liquid crystal display device of the present invention, in the step for forming an insulating film a layer of an insulating film material is firstly applied on the opposing surface of a substrate and then a next layer of the insulating film material is applied on the above described first layer before the first layer is dried, and a multilayered insulating film is formed by repeating the above described applying the material to form one layer. Therefore, the surface of such multilayered insulating film is very flat without undulation.

If the plain areas of the plural layers in the insulating film are changed to be smaller at every time one layer is laminated on the formaly laminated one layer while the insulating layer is formed to have a lamination structure as described above, uneven thickness portions of the layers each produced at an area near to the outer peripheral end surface of each layer are not stacked on each other, so that uneven thickness of the insulating film is eliminated.

Now the invention will be described in greater detail by referring to the accompanying drawings that illustrate preferred embodiments of the invention as well as conventional liquid crystal display devices for the purpose of comparison.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a sectional view schematically showing another conventional liquid crystal display device, which has an insulating film being formed by a known technique;

FIG. 4A is an enlarged partial view schematically showing the forming state of the color filters and the protective film of the conventional device of FIG. 3;

FIG. 4B is a more enlarged partial view of FIG. 4A;

FIGS. 5A and 5B are a plan view and a sectional view schematically showing one step of manufacturing the insulating film in another embodiment shown in FIG. 3;

FIGS. 6A and 6B are a plan view, schematically showing a printing plate to be used for applying a film material in the forming process of the insulating film of another embodiment shown in FIG. 3, and a sectional view schematically showing the cross section of the insulating film formed by applying the material on the substrate by using the printing plate;

DETAILED DESCRIPTION OF THE PREFERRED EMBODIMENTS

Figure 1:
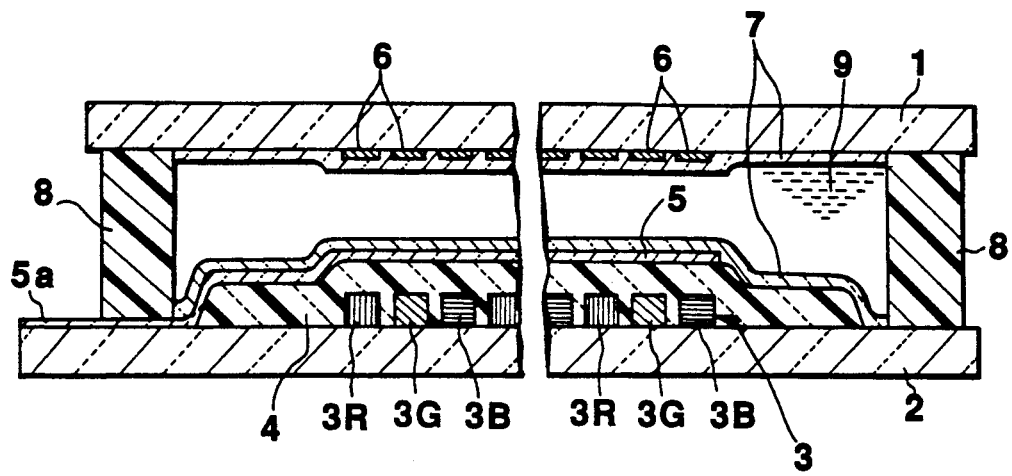
FIG. 1 is a cross sectional view schematically showing a conventional liquid crystal display device.
Figure 2A:
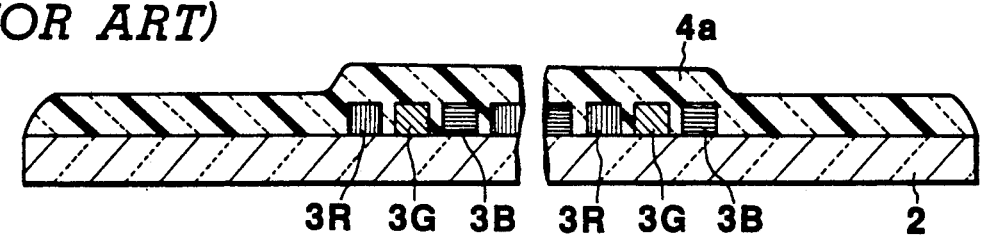
FIGS. 2A and 2B are sectional views schematically showing the two stages in a step of manufacturing the lower substrate of the device shown in FIG. 1.
Figure 2B:
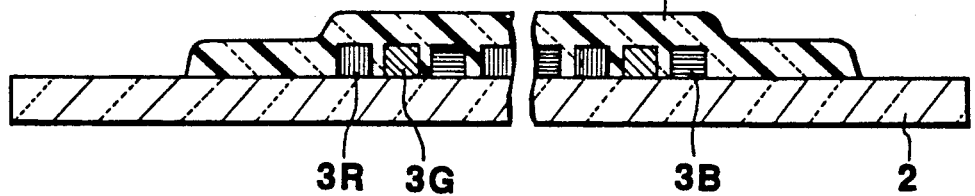
Figure 7:
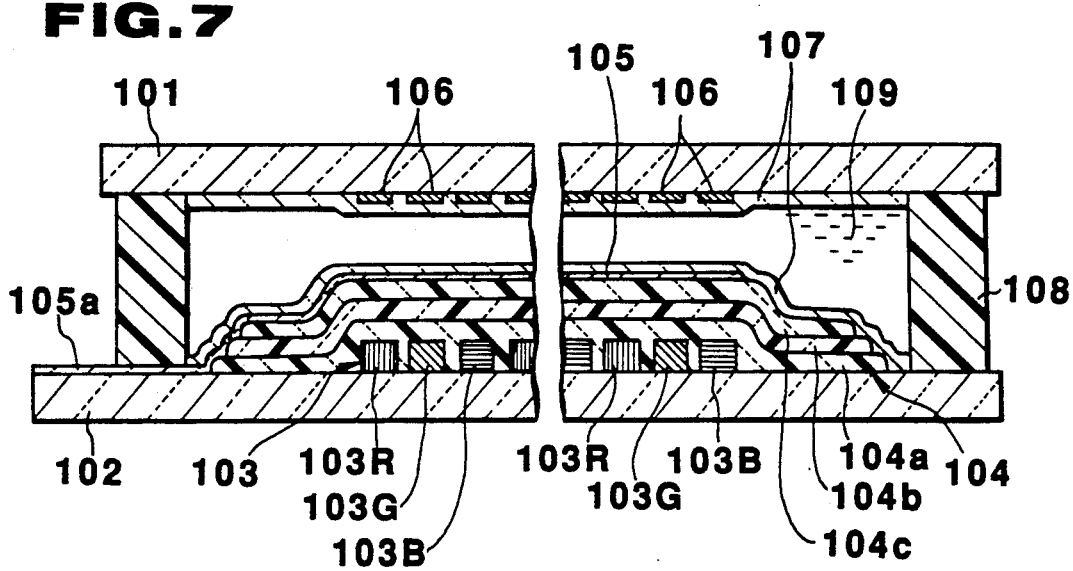
FIG. 7 is a sectional view schematically showing a first embodiment of the invention.

The first embodiment of the invention has a construction as shown in FIG. 7. In FIG. 7, a pair of upper and lower substrates 101 and 102 made of glass ar arranged to be opposed to each other. Striped color filters 103 are formed on the upper surface of the lower substrate 102, as a thin film member. The color filters 103 are constructed by red color filters 103R, green color filters 103G and blue color filters 103B three kinds of which are arranged alternately and in parallel to each other. A protective film 104 for covering and protecting the color filters 103 is further formed on the upper surface of the substrate 102 on which the color filters 103 are formed. The protective film 104 is a transparent insulation film or coat.

The protective film 104 is constructed as a three-layered structure formed by laminating thin insulation layers 104a, 104b and 104c each having a thickness of a third of a predetermined one of the protective film 104. The insulation layers 104a, 104b and 104c are made of a transparent resin material such as polyimide and are formed on the upper surface of the substrate 102 except its peripheral portion.

In the insulation layers 104a, 104b and 104c that constitute the protective film 104, the lowest or the first insulation layer 104a has the largest plain area while the middle or the second insulation layer 104b has the second largest plain area and the upperest or the third insulation layer 104c is made to have the smallest plain area. With such an arrangement, the peripheral edges of the insulation layers 104a, 104b and 104c are gradually inwardly set back in this order, so that the outer peripheral end surface of the protective film 104 is so shaped like stairs.

Striped display electrodes 105 made of a transparent electrically conductive film material such as ITO (indium-tin-oxide) are formed on the protective film 104. Striped display electrodes 106 also made of a transparent electrically conductive film material such as ITO are formed on the lower surface of the upper substrate 101 so as to extend in a direction perpendicular to the extending direction of the striped display electrodes 105. The display electrodes 105 on the lower substrate 102 are signal electrodes for example and the display electrodes 106 on the upper substrate 101 are scanning electrodes for example. Aligning films 107 are respectively formed on the upper surfaces of the display electrodes 105 and the protective film 104 and the lower surfaces of the display electrodes 106 and the upper substrate 101. The paired upper and lower substrates 101, 102 are bonded through a frame like sealing member 108 disposed therebetween to be located and outside of the protective film 104, so that the surfaces thereof on which the electrodes 105 and 106 are formed are opposed to each other. The space surrounded by the sealing member 108 between the upper and lower substrates 101, 102 is filled with a liquid crystal material 109.

The protective film 104 is formed in accordance with the manufacturing stages shown in FIGS. 8A through 8D.

Figure 8A:
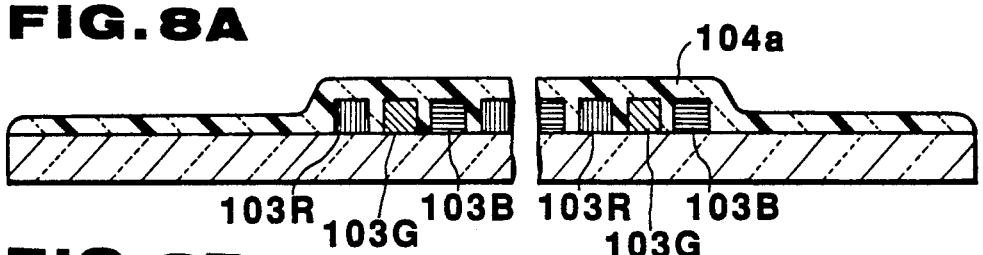
FIGS. 8A through 8D are sectional views schematically showing different stages in the forming process of the insulating film formed on the lower substrate in the first embodiment shown in FIG. 7.

Firstly, a transparent resin film material such as polyimide is applied to the entire area of the upper surface of the lower substrate 102 on which the color filters 103R, 103G and 103B are formed, by means of spin coat technique until the film layer has a thickness equal to a third of the desired total thickness of the protective film 104. After leaving it for several to tens of minutes, the applied film is baked to form a first insulation layer 104a as illustrated in FIG. 8A.

Figure 9A:
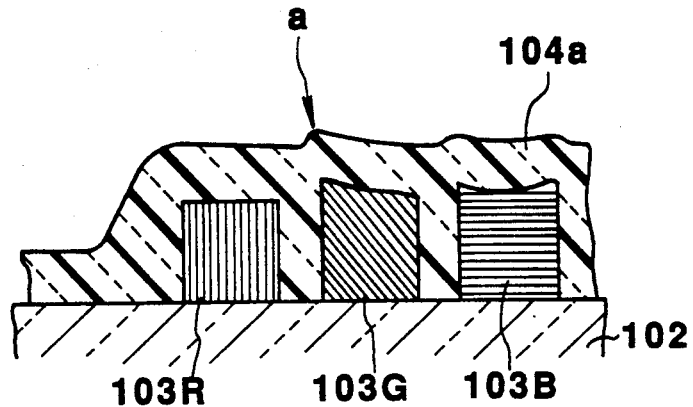
FIGS. 9A and 9B are enlarged partial views schematically showing a process for forming the first layer in the insulating film as shown in FIG. 8A.

The reason why the applied film is left for the several to tens of minutes from the application of the film material to the baking of the applied film is that the flatness of the surface of the newly formed insulation layer 104a can be more improved. The upper surface of each of the color filters 103R, 103G and 103B formed on the lower substrate 102 is not always flat and the one edge portion or both edge portions thereof rise or rises as illustrated in FIG. 9A. A cause of this phenomenon is the forming method of the color filters. Each of the color filters 103R, 103G and 103B is formed by firstly applying a filter material on the entire upper surface of the substrate 102 and then being etched to have its predetermined pattern. Therefore, when a second and third filter material are sequentially applied to the surface of the substrate 102 subsequent to the formation of the first set of color filters, each of these newly applied filter materials is raised along the side surfaces of the formerly formed color filter. Since the color filters 103R, 103G, and 103B are formed at the small intervals, the above described raised portions are left at the near side(s) to the formerly formed first or second color filters when the second and third color filters are formed from their corresponding film materials, so that the color filter formed at the second color filter forming process is raised at one edge portion of the upper surface thereof and the color filter formed at the third color filter forming process is raised at both edge portions of the upper surface thereof. In the color filters 103 illustrated in FIGS. 9A and 9B, the red color filters 103R are formed in the first forming process and then the green color filters 103G are formed in the second forming process and finally the blue color filters 103B are formed in the third forming process. Therefore, the upper surface of each of the green color filters 103G formed in the second forming process is raised at one side portion located near to the adjacent one of the red filters 103R, and the upper surface of each of the blue color filters 103B formed in the third forming process is raised at the both side portions located near to the adjacent ones of the red and green color filters 103R, 103G formed in the first and second forming processes.

When the film material for the insulation layer 104a is applied on the lower substrate 102 in a case that one side portion or the both side portions of the upper surface of each green color filter 103G or the each blue color filter 103B is raised, the applied film has raised portions "a" in accordance with the shapes of the upper surfaces of the color filters 103G, 103B, as illustrated in FIG. 9A. If the applied film is baked as it is, the above described raised portions "a" remains in the upper surface of the formed insulating layer 104a, so that the flatness of the upper surface is impaired.

Figure 9B:
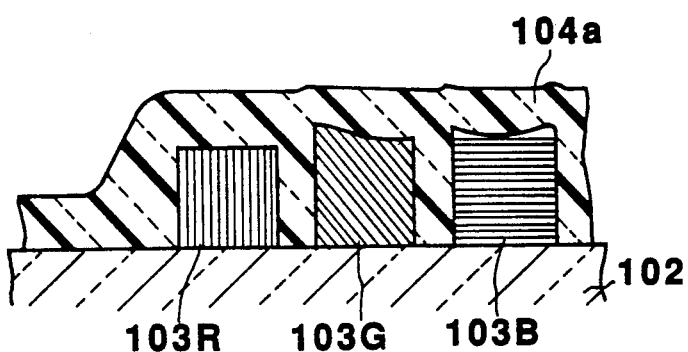

On the contrary, when the applied film material is left for several to tens of minutes, the transparent applied film material flows down from the raised portions "a" to the lower portion located around the raised portions "a", so that the height of the raised portions "a" is lowered as shown in FIG. 9B. Then, if the applied film will be baked, the insulating layer 104a the upper surface of which has a high flatness is formed. The above described left time is set in accordance with the viscosity of the film material to be applied.

Figure 8B:
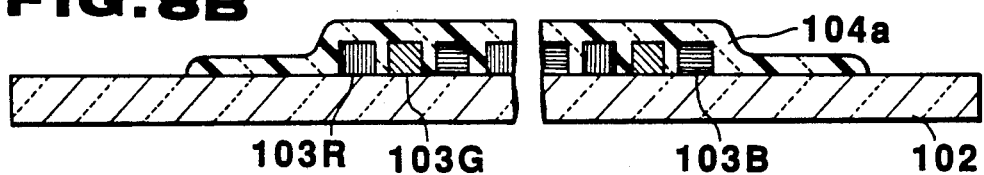

After the first insulation layer 104a is so formed on the lower substrate 102 as described above, its outer peripheral portion is removed by etching to expose the outer peripheral portion of the lower substrate 102 as illustrated in FIG. 8B.

Figure 8C:
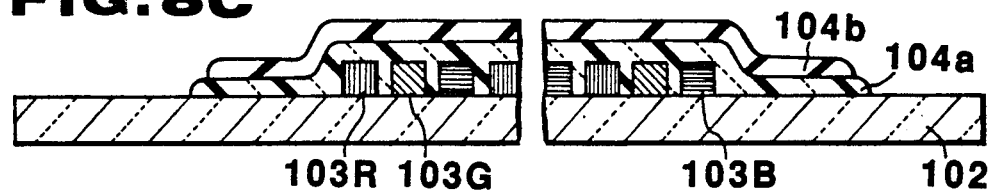
Figure 8D:
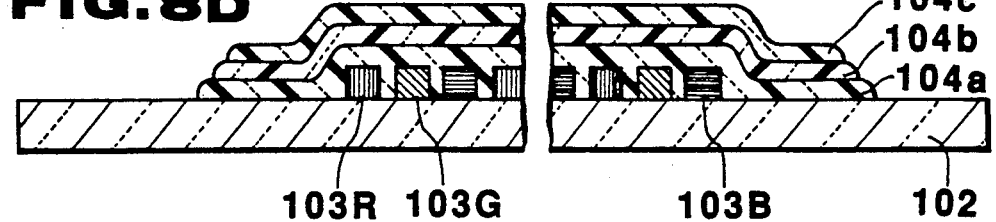

A forming process similar to that of forming the first insulation layer 104a is repeated to form a second insulation layer 104b having a smaller plain area than that of the first insulation layer 104a as shown in FIG. 8C. Thereafter, a third insulation layer 104c having a further smaller plain area than that of the second insulation layer 104b is formed in a similar manner as illustrated in FIG. 8D, so that a three-layered protective film 104 is constructed.

When the second and third insulation layers 104b and 104c are formed, there is no need to take the time for leaving the newly applied film material because the flatness of the upper surface of the first insulation layer 104a located under thereof is high. However, if it will take the time for leaving the newly applied film material before it will be baked when the second and third insulation layers 104b, 104c are formed, the flatness of the upper surface of the protection film 104 (or the upper surface of the third insulation layer 104c) can be further improved. The time required for etching the outer peripheral portion of the second insulation layer 104b and that for the third insulation layer 104c are set in accordance with the thickness of the respective layers. When the outer peripheral portions of the second and third insulation layers 104b and 104c are so etched as described above, the outer peripheral portion of the first insulation layer 104a and that of the second insulation, both of which corresponding to the etched outer peripheral portions of the second and third insulation layer 104b, 104c, can be left. Therefore, the outer peripheral end surface of the finally formed protection film 104 is a stair-like gentle slope as shown in FIG. 8D. Even if the predetermined etching time for the outer peripheral portions of the second and third insulation layers are set, the outer peripheral portions of the first and second insulation layers 104a, 104b corresponding to the etched outer peripheral portions of the second and third insulation layers 104b, 104c are slightly etched when the outer peripheral portions of the second and the third insulation layers 104b, 104c are etched. Such slightly etching is preferable because it makes the stair-like gentle slope of the outer peripheral end surface of the finally formed protective film 104 more gradual.

Referring now to FIG. 7, display electrodes 105 are formed to be extended from the upper surface of the protective film 104 to the outer peripheral portion of the upper surface of the lower substrate 102, and their terminals 105a are located at the outer peripheral portion. The display electrodes 105 are formed by depositing a transparent electrically conductive material such as ITO on the entire upper surface of the lower substrate 102, on which the protective film 104 have been formed, by means of spattering or some other appropriate method, and then patterning by means of photolithography.

In the liquid crystal display device of the above described embodiment, comprising the lower substrate 102, a plurality of the color filters 103R, 103G and 103B formed on the substrate and the protective film 104 for covering the filters, the protective film 104, formed on the lower substrate 102 on which the color filters 103 has been formed, is constructed as a three-layered structure constituted by three thin insulation layers 104a, 104b and 104c each having a thickness equal to a third of the protective film 104, and plain surface areas thereof are different from each other to set back the outer peripheral edge of the upper layer to that of the lower one so that the outer peripheral end surface of the protective film 104 is constructed as a gentle slope. Thus, when a transparent electrically conductive material such as ITO is deposited on the protective film 104 and the outer peripheral end portion of the lower substrate 102, which is not covered with the protective film 104, to form the transparent electrically conductive film to be shaped as the display electrodes, the electrically conductive material can be deposited to a sufficient height not to cause the display electrodes formed by patterning the transparent electrically conductive film to be broken at the outer peripheral end surface of the protective film 104.

Moreover, in the above described embodiment, since at least the first insulation layer 104a located lowest in the three insulation layers 104a, 104b and 104c is left for several to tens of minutes after a film material for it is applied during it forming process and then the insulation layer 104a is baked, the upper surface of the protective film 104 constructed by further laminating the second and third insulation layers 104b and 104c on the first insulation layer 104a can have a good flatness at its upper surface so that the thickness of the display electrodes 105 formed on the insulation film 104 can be very even. If the second and third insulation layers 104b and 104c are also formed by taking the leaving time after the transparent resin liquid for then is applied and then baking the applied resin liquid, the upper surface of the finally formed protective film 104 can have a more improved flatness and the thickness of the display electrodes 105 formed on it will become much more even.

Figure 10:
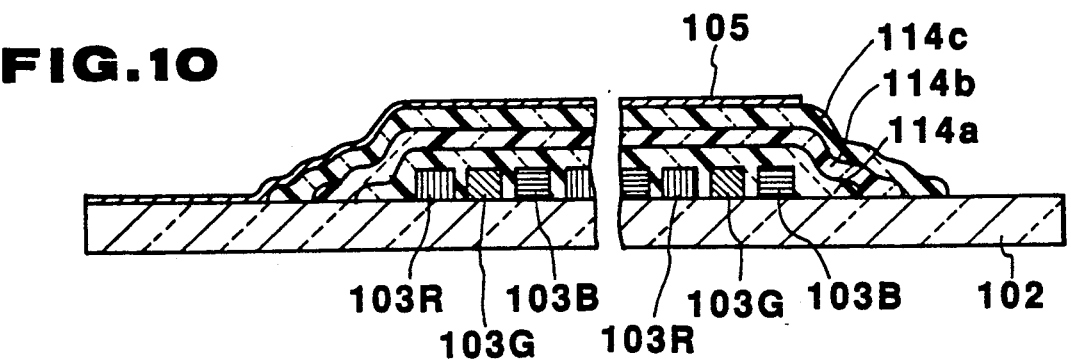
FIG. 10 is a sectional view schematically showing a modification of the first embodiment.

While the plain surface areas of the insulation layers 104a, 104b and 104c that constitute the protective film 104 of this embodiment decrease in the mentioned order, they may alternatively be increased in that order as illustrated in FIG. 10 so that the middle layer 114b has a plain surface area larger than that of the lowermost layer 114a and the uppermost layer 104c has a plain surface area larger than that of the middle layer 114b, consequently the step between the outer peripheral edge portions of the lowermost and middle layers 114a and 114b are covered with the middle and uppermost layers 114b and 114c. With such an arrangement, the inclination of the above described step becomes gentle so that the outer peripheral end surface of the protective film 104 becomes more gradual to effectively prevent any breakage of the display electrodes 105 formed to extend from the upper surface of the protective film 104 to the peripheral end portion of the lower substrate 102.

While all the insulation layers 104a, 104b and 104c that constitute the protective film 104 of the first embodiment are equally made of a transparent resin material such as polyimide, the layers other than the lowermost layer 104a may be alternatively made of SiO2 or by means of SOG (spin on glass technique).

The protective film 104 is not limited to the three-layered structure, and it may be a laminated film having more than two layers. If the protective film 104 is constituted by a multi-layered structure having the number of layers more than three, the outer peripheral end surface of the protective film 104 can be a more gentle slope.

In the above described first embodiment, a film material to be used to form the insulation layers 104a, 104b and 104c constituting the protective film 104 is applied by means of spin coat technique, but the film material may be applied by a transfer technique or printing technique. When any of these alternative technique is used, the film material may be applied to correspond to the finally formed plain area of each of the insulation layers 104a, 104b and 104c, so that the etching operation may be omitted.

Figure 11:
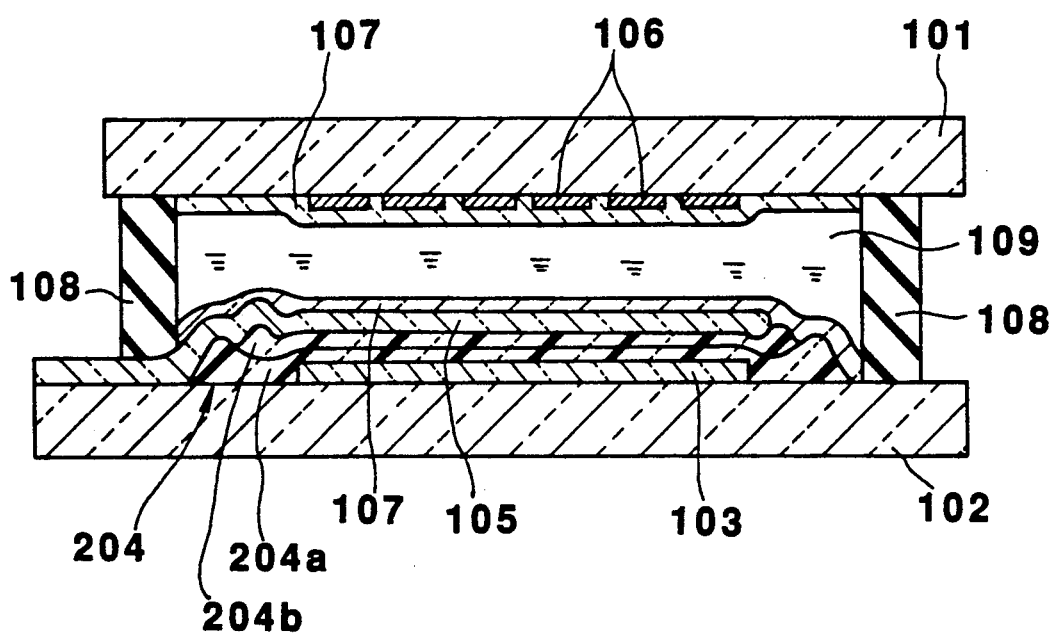
FIG. 11 is a sectional view schematically showing a second embodiment of the invention.

The second example in which a protective film is formed by means of a printing technique will now be described with reference to FIG. 11. In FIG. 11, those elements which are similar to those of the first embodiments are denoted by the same reference numerals and any further detailed description thereof will be omitted.

Color filters 103 including red, green and blue color filters are formed as a thin film member on the upper surface of a lower substrate 102, and a protective film 204 is formed thereon to cover the color filters 103. The protective film 204 has a two-layered structure comprising first and second insulation layers 204a and 204b. The plain surface area of the second insulation layer 204b is smaller than that of the first insulation layer 204a so that the outer peripheral end portion of the second insulation layer 204b is not overlapped on the outer peripheral end portion of the second insulation layer 204b. Then, display electrodes 105 are formed on the protective film 204 and an aligning film 107 are further formed on the display electrodes 105.

On the lower surface of an upper substrate 101, display electrodes 106 and an aligning film 107 are disposed in this order. These upper and lower substrates 101 and 102 are bound together with a sealing member 108 interposed therebetween, and the space surrounded by a sealing member 108 between the upper and lower substrates 101 and 102 is filled with a liquid crystal material 109.

In this second embodiment, since the protective film 204 has a multi-layered structure and the outer peripheral end portion of the layers are set back not to overlap each other, the protective film 204 is prevented from being thin in its thickness at the outer peripheral end surface of the color filters 103, and the steps in the outer peripheral end surface becomes gentle in its inclination.

The color filters 103 and the protective film 204 of this second embodiment are formed on the lower substrate 102 in the following manner.

Figure 12A:
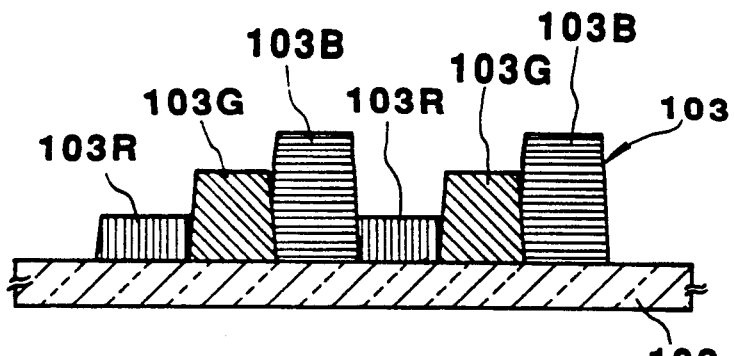
FIGS. 12A through 12E are enlarged sectional views schematically showing the different stages in the forming process of an insulating film in the second embodiment.

The color filters 103 constituted of red, green and blue color filters 103R, 103G and 103B are firstly formed on the lower substrate 102 made of glass or a similar material, as illustrated in FIG. 12A. In FIG. 12A, the thickness of color filters 103R, 103G, 103B is increased in the order of the red, green, and blue, but these three filters may have a same thickness and the thickness thereof is increased in the order of the blue, green and red.

Figure 12B:
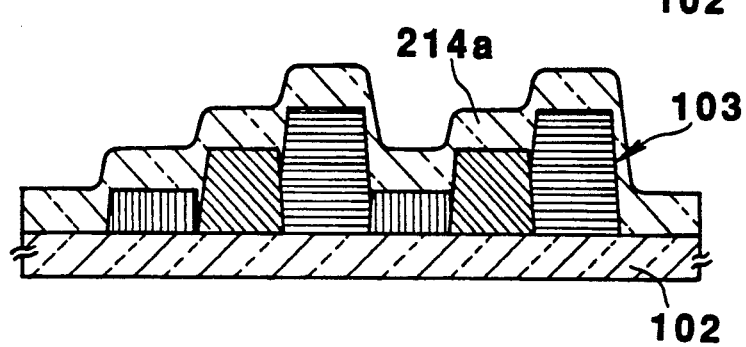

Then, as illustrated in FIG. 12B, a film material is applied on the upper surface of the lower substrate 102, on which the color filters 103 have been formed, by means of a printing technique described later to form a first insulation layer 204a. As the film material in this case, for example polyimide based material, that contains a silicon compound expressed by chemical formula

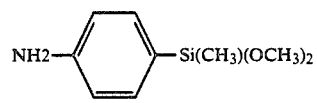

by about 20 mol % is used. The content of such a silicon compound is preferably for example between 5 and 50 mol %.

Figure 12C:
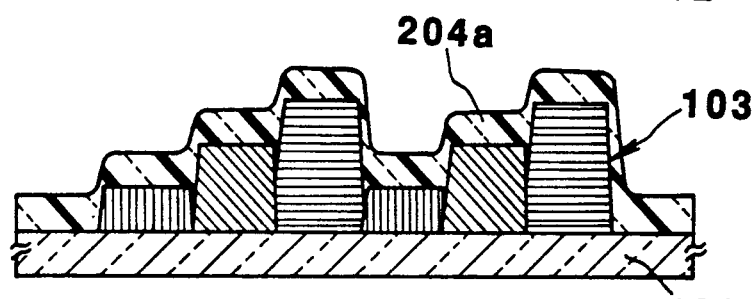
Figure 12D:
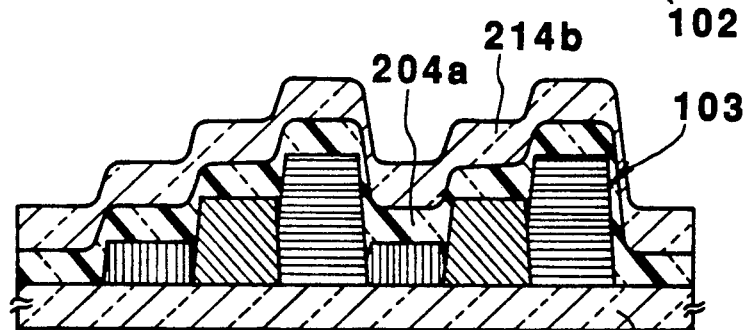
Figure 12E:
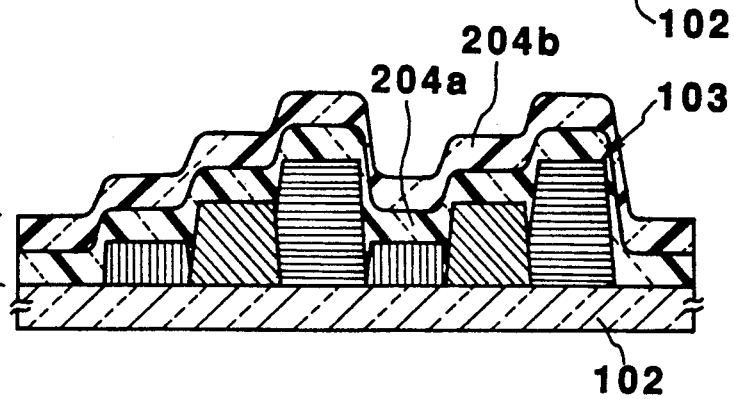

The first applied film 214a is preliminarily dried for hardening, so that it changes to the first insulation layer 204a having a thickness 20 to 30% smaller than that of the first applied film 214a, as illustrated in FIG. 12C. Subsequently, as shown in FIG. 12D, like the above described first insulation layer 204a, a film material for a second insulation layer is applied on the first insulation layer 204a. The film material for the second insulation layer is the same as that of the film material for the first insulation layer. The second applied film 214b is preliminarily dried for hardening, so that it changes to the second insulation layer 204b having a thickness 20 to 30% smaller than that of the second applied film 214b, as illustrated in FIG. 12E.

As described above, a sufficiently thick protective film 240 constructed by the first insulation layer 204a and the second insulation layer 204b is formed by repeating the operation of applying and drying the film material on the color filters 103 twice.

According to this example, since the operation of applying and drying a film material on the color filters 103 is repeated twice, if the thickness of the first insulation layer 204a at the edges of the color filters 103 is thin, it is compensated by the second insulation layer 204b laminated on the first insulation layer 204a to provided a sufficient overall thickness of the protective film 204 even at the edges of the color filters 103. Moreover, the upper surface of the finally formed protective film 240 can keeps it high flatness because there is no need to use highly viscous material as the film material. Additionally, if the film material contained the silicon compound is used, the hardness of the protective film 204 can be increased, so that the protective film 204 can stand any strain and stress that may arise during the subsequent heat treatment process. Further, since the thermal expansion coefficient of the protective film can be close to that of ITO used for the material of the transparent electrodes, the above described strain and stress will be minimized. Consequently, the protective film 204 will be free from cracks and any breakage of the transparent electrodes caused by the crocks can be effectively prevented.

Figure 13:
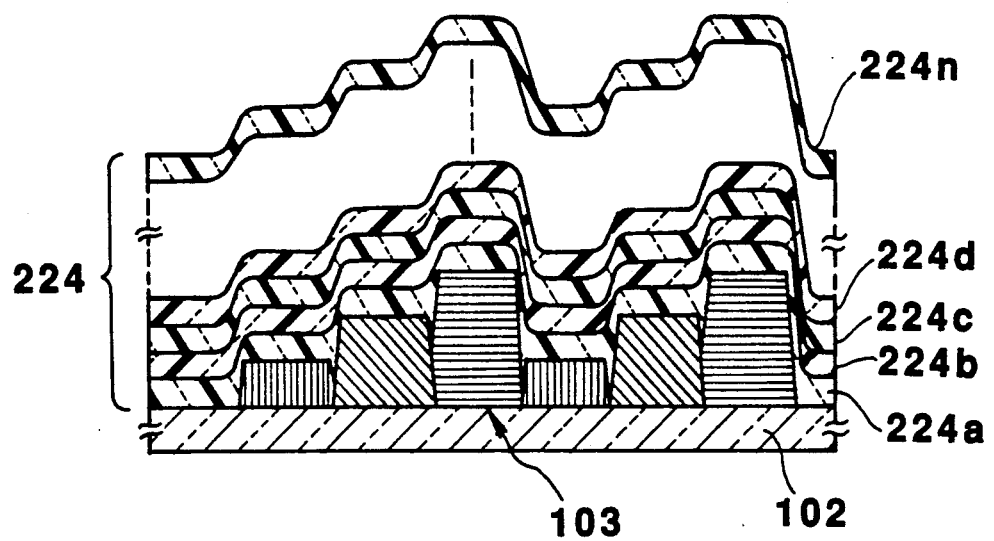
FIG. 13 is a sectional view schematically showing a modification of the second embodiment.

In the above described embodiment the protective film is formed by repeating the operation of applying and drying the film material twice to have a two-layered construction, however, the protective film may be formed by repeating the above described operation more than twice to have a multi-layered construction having more than two layers. As shown in FIG. 13, a multi-layered protective film 224 having a first insulation layer 244a, a second insulation layer 224b, ... a n-th insulation layer (n>3) can be formed by repeating n times the operation of applying and drying a same film material. According to the modification of the second embodiment, the thickness of the protective film 224 can be considerably increased, and consequently improves the flatness of its surface and its coverability which effectively prevents any formation of cracks in the protective film 224.

In this case, if the mumber of times of repeating the operation of applying and drying is set at the desired mumber, a desired thickness of the protective film can be obtained. In the above described second embodiment and its modification, a film material for forming the protective film 204, 224 is applied on the lower substrate 102 by a technique similar to offset printing with a printing plate on which the printing pattern having the shape and size corresponding to the protective film 204 or 224 to be formed on the lower substrate 102.

Figure 14A:
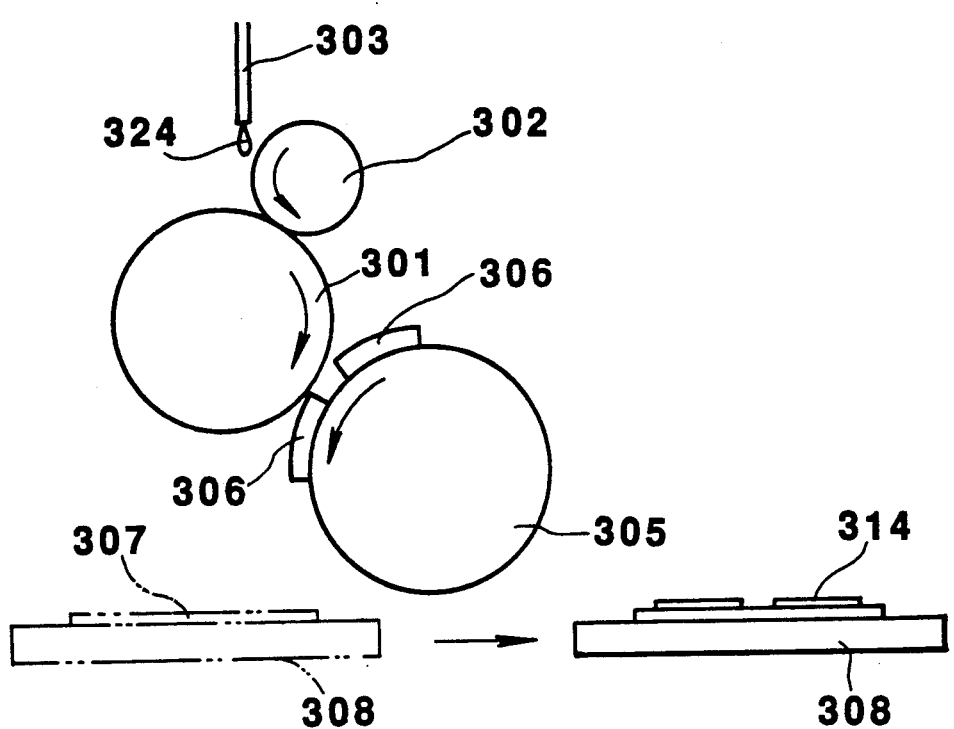
FIG. 14A is a schematic view showing a main construction of an apparatus to be used for applying a film material to form the insulating film in the second embodiment.
Figure 14B:
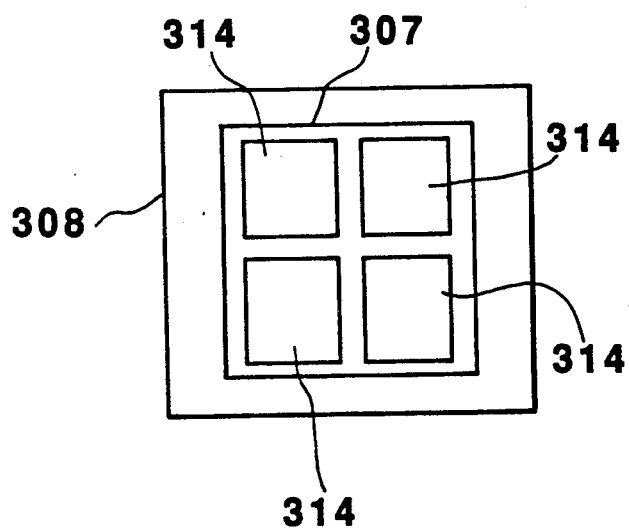
FIG. 14B is a plan view schematically showing the substrate on which a film material is applied by means of the film material applying apparatus shown in FIG. 14A.

A technique for applying a film material and for processing the material into a protective film will be described in the followings. FIG. 14A shows a schematical construction of an apparatus to be used for applying a film material on a substrate, and FIG. 14B schematically shows a glass substrate on which a film material is applied. In FIG. 14A, a pair of rollers 301 and 302 are arranged to be in contact with each other, and a nozzle 303 for supplying a film material 324 for forming a protective film is arranged above the contacting portion of the rollers 301 and 302. A drum 305 is arranged at a position close to the roller 301 of the roller pair 301 and 302, and a projecting pattern 306 having a shape corresponding to an area to be formed with a protective film on a substrate 308 is mounted on the outer peripheral surface of the drum 305. The projecting pattern 306 contacts the outer peripheral surface of the roller 301. Below the drum 305, a table 308 is arranged to be able to move in a horizontal direction in synchronism with the rotary movement of the drum 305. A large sized glass substrate 307 on which a film material 324 is applied is laid on the table 308, so that the projecting pattern 306 on the peripheral surface of the drum 305 is in contact with the glass substrate 307 when the table 308 is passed under the drum 305. The glass substrate 307 has a size corresponding to a plurality of cells (four in the case of FIG. 14B, for example) so that a plurality of liquid crystal cells can be manufactured simultaneously, while the printing plate 306 has a plurality of projecting patterns the member of which corresponds to that of the plural cells to be formed on the above described large-sized glass plate.

For applying a film material to the upper surface of the glass substrate 307, the liquid film material 324 is dropped from the nozzle 303. The dropped film material 324 is spread out between the paired rollers 301, 302, and then applied on the outer peripheral surface of the roller 301. The film material 324 evenly applied on the outer peripheral surface of the roller 301 is then attached on the surface of the projecting pattern 306 arranged on the drum 305, and thereafter the film material 324 is transferred to the glass substrate 307 disposed on the table 308 moving in synchronism with the rotation of the drum 305, as illustrated in FIG. 14A. Consequently, the film material is applied on the four areas, on which the liquid crystal cells to be formed, of the upper surface of the glass substrate 307, and applied films 314 are formed on the four areas respectively.

Figure 15A:
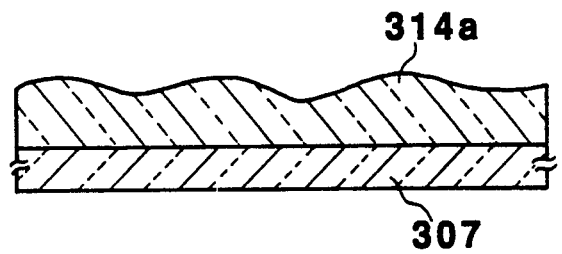
FIGS. 15A through 15F are sectional views schematically showing the different stages in the forming process of an insulating film formed by means of the apparatus shown in FIG. 14A.
Figure 15B:
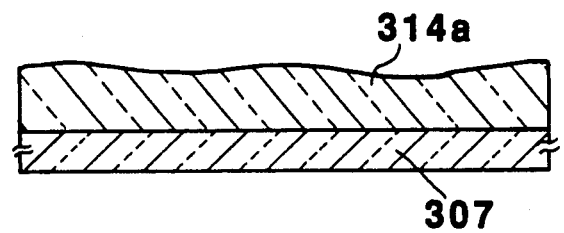

In the above described protective film of the second embodiment, a film material is applied by means of the above described applying method, and then it is formed as a film as shown in FIGS. 15A through 15F (in which the color filters formed on the glass substrate are omitted). At first, the film material 324 is applied on the glass substrate 307 by means of the above described applying method to form the applied film 314, and then the film material is further applied to form the next applied film 314 before the former applied film 314 is dried. That is, the film material 324 is applied sequentially at two times to form a first applied film 314a as illustrated in FIG. 15A. Since the film material 314 is applied sequentially at two times before the former applied film material 324 is dried, the upper surface of the applied film 314a can be more flattened than in the case that the applied material 324 is applied only at one time as in the conventional. Then, the layer is left as it is for more than five minutes at room temperature so that the upper surface of the applied film 314a is further flattened because the raised portion in the undulation of the film surface flows down to the lowered portion to reduce the difference in height in the dulation of the film surface. In view of this self-flattening effect of the film material, it may be preferable that the solvent having a high fluidity is used as a solvent for diluting the film material, for example a calbitol-based solvent or a cellsolve-based solvent having a low surface tension or any other solvent having a low viscosity between 20 and 100 cp.

Figure 15C:
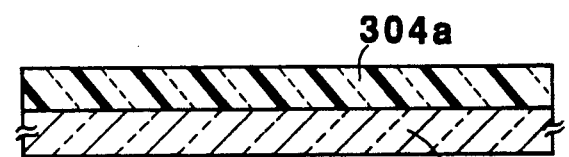

Thereafter, the applied film 314a is preliminary dried to form the hardened insulation layer 304a, as illustrated in FIG. 15C. In this process, the thickness of the first insulation layer 304a is reduced from that of the non-hardened applied film 314a by 20 to 30%, so that the flatness of the upper surface of the insulation layer 304a is further improved. The preliminary drying process is preferably conducted at temperature of 40° to 150° C. for 1 to 30 minutes.

Figure 15D:
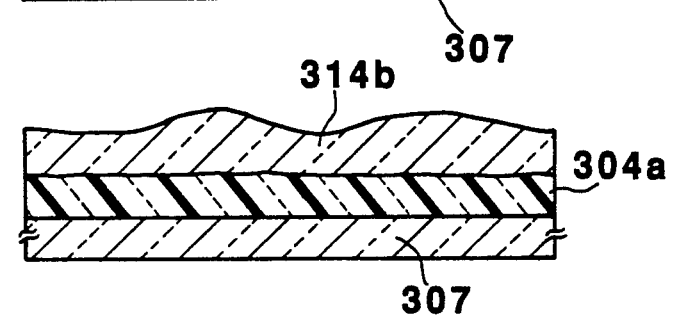
Figure 15E:
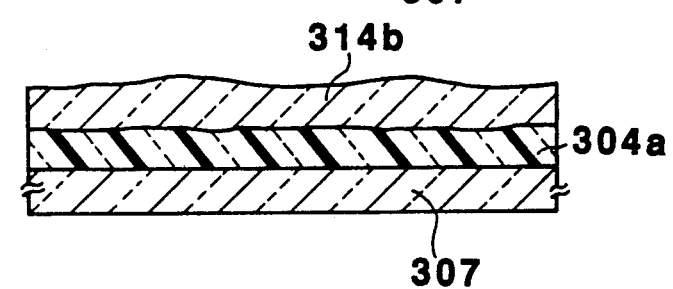
Figure 15F:
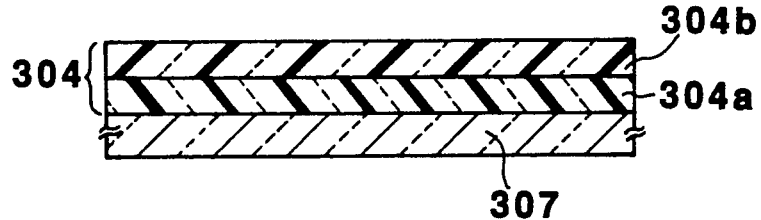

Then, as illustrated in FIG. 15D, a second applied film 314b is formed on the hardened first insulation layer 304a by sequentially applying the film material at two times by means of the same applying technique as described above. Then the applied second film is left as it is at room temperature so that the surface is flattened as illustrated in FIG. 15E. The applied film 314b is preliminarily dried to form a hardened second insulation layer 304b as illustrated in FIG. 15F.

Consequently, now the protective film 304 having a two-layered construction consisting of a first insulation layer 304a and a second insulation layer 304b is formed.

In the embodiment, since each of the two insulation layers is formed by applying a film material at two times and being left at room temperature before it is hardened, and the process consisting of two times applying of the film material and leaving at the room temperatures is repeated at two times, the protective film 304 of the tow layered construction superior to the flatness is formed.

The dulation of the surface of the protective film 304 (changes in the thickness of the protective film) formed in this embodiment is measured. When the surface condition of the conventional protective film formed by applying the film material only at one time and that of the protective film formed according to this invention by applying sequentially the film material at two times are compared to each other, this embodiment is superior to the convention one in the items of both "variation of thickness" and "height of undulation". The height of undulation of the protective film formed in this embodiment is limited to a value as low as 100 to 200 Å. Here, "height of undulation" means the difference between the highest point and the lowest point of the surface undulation, whereas "variation of thickness" means the degree of variation of the thickness of the protective film, and "variation of thickness" is expressed by formula $(3\sigma/X) \times 100[\%]$, where $X$ is the height of undulation and $\sigma$ is the standard deviation of the distribution of film thickness.

TABLE 1

| method of application | film thickness ($\mu$m) | variation of thickness (%) | height of undulation (Å) |
|---|---|---|---|
| single | 1.5 | 10–15 | 1,000–1500 |
| double | 1.5 | 5–8 | 100–200 |

While each of the insulation layers of the above embodiment is formed by repeating at twice times a process of double application of a film material, being left at the room temperature and being dried to be hardened, the number of repetition of the above described process may be a given number n (n>3). It may be obvious that the flatness of the surface of the protective film can be improved by increasing the number of repetition of the above described process. It may be also clear that a protective film having a desired thickness can be formed by appropriately repeating the above described process.

In the above embodiment the protective film material is sequentially applied at two times, but it can be sequentially applied at more than three times.

It may be understood that the protective film 304 having a highly flat surface can be formed by the above described film forming method. However, when the above described film forming method is applied to a multilayered protective film as in the first and second embodiments, a wall 42c of the protective film 42a is formed along the outer peripheral end portion of the printing plate 306 as described in the conventional technique with reference to FIG. 6B. If the walls of the plural insulation layers in the protective film are overlapped each other, the flatness of the peripheral end portion of the protective film is injured, and the step between the protective film and the substrate becomes steep. Therefore, the display electrodes arranged on the protective film tends to be broken at the overlapped walls. Besides, in a case that the substrate is bound to an opposing substrate, if the wall contact the opposing substrate a gap between the paired substrates becomes uneven or a gap member for determing the width of the gap lays on the wall to make the gap being uneven.

In order to dissolve the above described problems, in the second embodiment of this invention the protective film is formed as the following manner. To begin with, the first insulation layer 204a is formed on the lower substrate 102 on which the color filters 103 are formed by subsequently applying a film material at two times and preliminary drying the applied film material at low temperature and then baking the preliminary dried film material to harden it.

Figure 17:
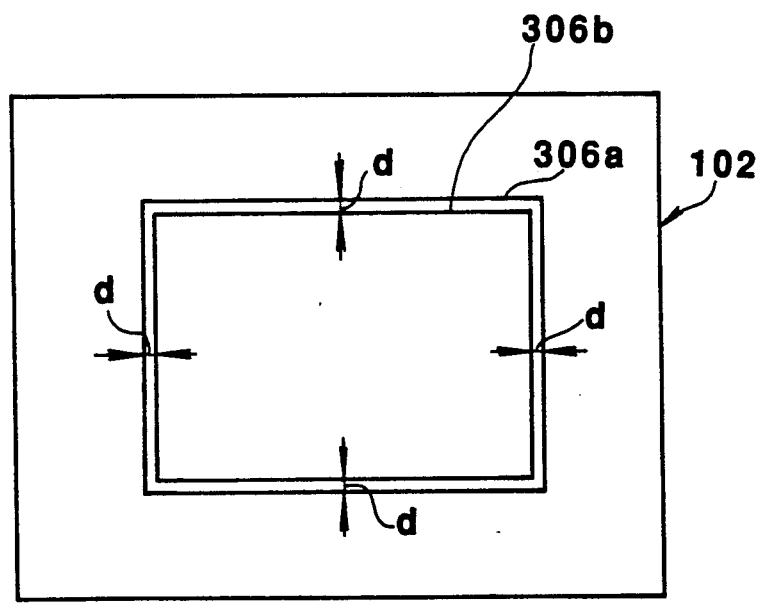
FIG. 17 is a plan view schematically showing a plian shape of a printing plate to be used for applying a film material in the process shown in FIGS. 16A and 16B.

Thereafter, a second insulation layer 204b is formed by the same forming process as that used in forming the first insulation layer 204a on an surface area of the first insulation layer 204a, which is small enough to avoid the raised edges of the first insulation layer 204a. The second insulation layer 204b is applied by using a projecting pattern 306b which is smaller in size than the projecting pattern used for forming the first insulating layer 204a. For example, a projecting pattern 306a is used for forming the first insulation layer 204a, and another projecting pattern 306b, which is smaller than the projecting pattern 306a by a size of "d" in both the longitudinal and width directions, is used for forming the second insulating layer 204b, as illustrated in FIG. 17, where d is selected between 0.1 and 2.0 mm. By using two projecting patterns 306a and 306b, which are different from each other in their size, for forming the first and second insulation layers 204a and 204b, the outer peripheral wall of the second insulation layer 204b can be located inside the outer peripheral wall of the first insulation layer 204a.

Figure 16A:
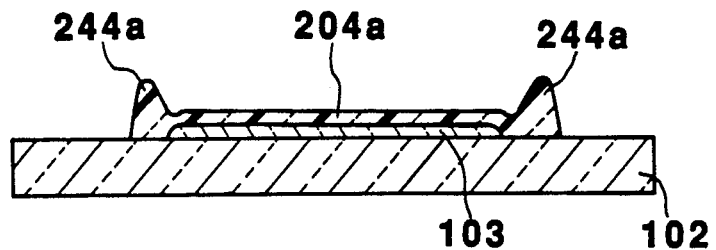
FIGS. 16A and 16B are sectional views showing the forming process of the insulating film in the first embodiment.
Figure 16B:
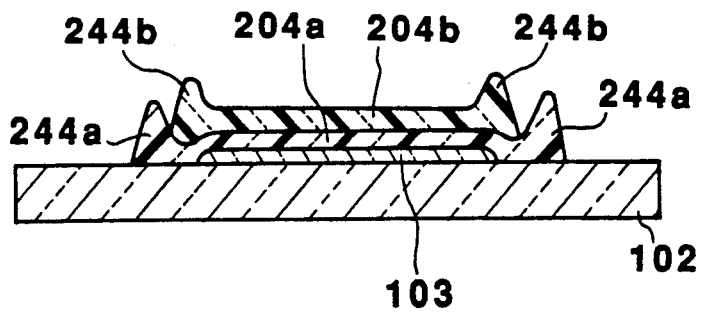

In short, by repeating the process comprising a step of double application of a film material and a step of drying and hardening and by using for the second insulation layer the projecting pattern 306b having dimensions smaller than those of the projecting pattern 306a for the first insulation layer, the outer peripheral wall 244b of the second insulation layer 204b is located inside the outer peripheral wall 244a of the first insulation layer 204a, the two peripheral walls 244a and 244b being separated by the difference of the size of the two projecting patterns 306a and 306b. Consequently, the peripheral wall of the second insulation layer never overlaps that of the first insulation layer, and therefore the height of the finally formed wall is limited relatively low as seen from FIG. 16B.

Figure 18:
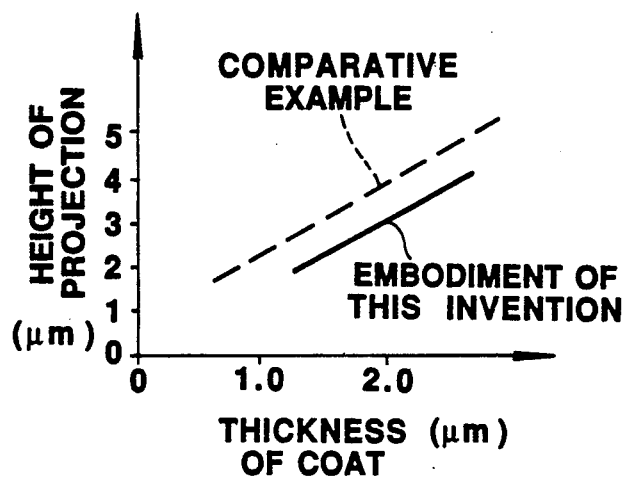
FIG. 18 is a graph schematically showing the relationship between height of the projection or wall formed on the insulating film and the thickness of the insulating coat or film in the second embodiment and those of a comparative example.

The effect of using two projecting patterns with different sizes is clearly shown in FIG. 18, in which the relationship between the height of the peak (the highest point of the wall 244b) of the second insulation layer 204b from the upper surface of the lower substrate 102 and the thickness of the two-layered protective film or coat 204 measured at its center is illustrated. In FIG. 18, the solid line shows the above described relationship of the second embodiment and the broken line shows the above described relationship in a comparative example of the two-layered protective film which is formed by using the one-size projecting pattern. As is apparent from the graph, both the embodiment and the comparative example show a tendency of increase of the peak height with the increase of film thickness, but the embodiment has a particularly smaller height than that of the comparison example. If the thickness of the film or coat is 2.5 $\mu$m, the height of the peak in the comparison example is 4.5 $\mu$m in average and 6.5 $\mu$m in the maximum, and that of this embodiment is 3.5 $\mu$m in average and 4.5 $\mu$m in the maximum.

When the peak height of the outer peripheral wall is limited to the low level, the display electrodes 105 arranged on the protective film 204 become practically free from any sharp bendings at or near the wall so that they escape from the breakage at or near the wall. Besides, since the height of the wall is not very large, it does never contact with the opposing surface of the opposing substrate and therefore the gap between the substrate pair remains constant.

Figure 19A:
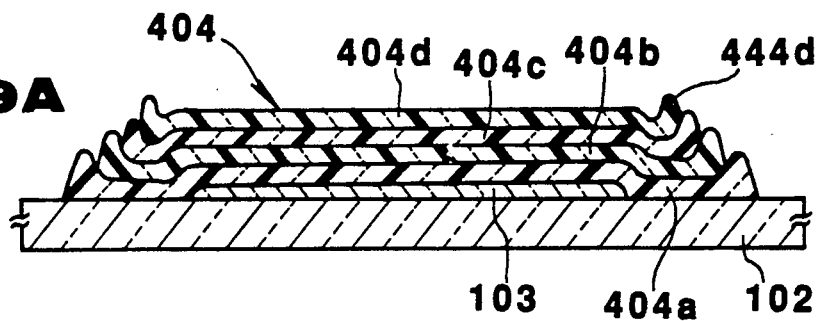
FIG. 19A is a sectional view schematically showing a modification of the second embodiment.
Figure 19B:
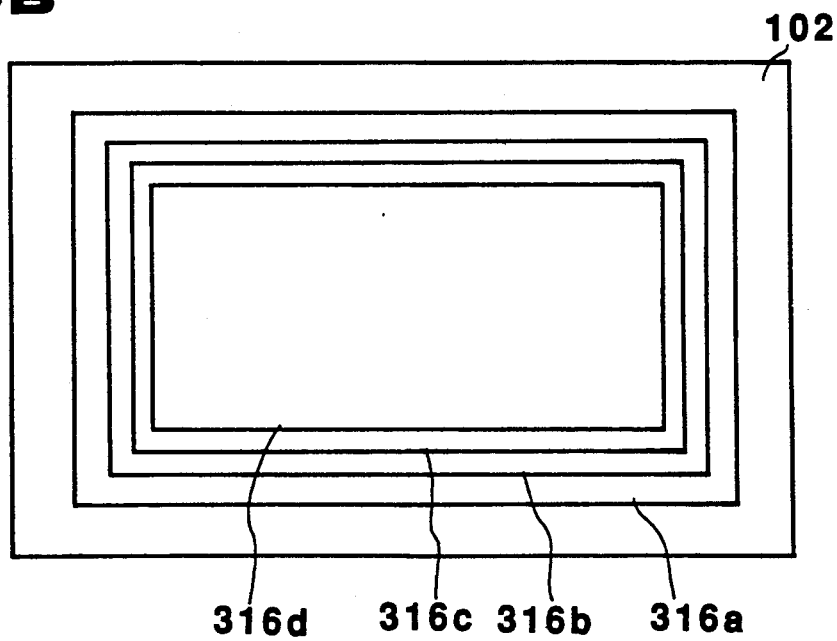
FIG. 19B is a plan view schematically showing a shape of a printing plate to be used for forming an insulating film of the modification of FIG. 19A.

While the second embodiment of FIG. 11 is formed by repeating twice the process comprising a double application of a film material and a step of drying and hardening, the number of repetition of the process is not necessarily limited to two and the process may be repeated a number of times, reducing each time the area of application of the film material as illustrated in FIG. 19A, where a total of four insulation layers are formed. These four insulation layers 404a, 404b, 404c and 404d having respectively outer peripheral walls 444a, 444b, 444c and 444d each of which are displaced from the adjacent ones are formed by using four projecting patterns 316a, 316b, 316c and 316d whose sizes are progressively reduced in the above mentioned order.

With such an arrangement, a highly thick protective film 404 can be formed without increasing the added overall height of the outer peripheral walls. Such a protective film can have an enhanced flatness and therefore an excellent protection capability. Moreover, such a protective film may have any desired thickness because it can be realized by simply repeating the process of application of a film material and subsequent drying and hardening as described earlier.

The above described method of the invention can be used not only for preparation of protective films for color filters of liquid crystal display devices but also for formation of various films such as aligning films and insulation film of liquid crystal display devices having different structures.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A liquid crystal display device comprising:
 a pair of substrates arranged to be opposed to each other;
 at least one first electrode mounted on one of said substrates;
 a plurality of second electrodes mounted on the other of said substrates so as to oppose the at least one first electrode;
 a thin film member mounted on an opposing surface of said other substrates which is opposing said one of said substrates;
 an insulating film formed above a predetermined area of said other substrate to cover said thin film member and said insulating film comprising a plurality of insulation layers arranged one on the other, said plurality of insulation layers each including respective outer peripheries which have sub-areas being different from each other in their area so that a peripheral surface of said insulating film is formed to be shaped as a staircase including a plurality of steps, the sub-areas of said insulation layers of said insulating film successively changing in area from said other substrate toward said one of said substrates;
 a liquid crystal material interposed between said first and second electrodes; and
 a sealing member for hermetically binding together said pair of substrates with a predetermined gap interposed between said substrates.

2. A liquid crystal display device according to claim 1, wherein a surface area of an upper one of said plurality of insulation layers is smaller than that of a lower one of said plurality of insulation layers, the lower one being located just below the upper one, so that the outer peripheries of said plurality of insulation layers are arranged like stairs.

3. A liquid crystal display device according to claim 1, wherein a surface area of an upper one of said plurality of insulation layers is larger than that of a lower one of said plurality of insulation layers, the lower one being located just below the upper one, so that a surface of the outer periphery of the upper one of said plurality of insulation layers overlaps the outer periphery of the lower one of said plurality of insulation layers, wherein said insulation layers are arranged as a plurality of successive steps to form stairs.

4. A liquid crystal display device according to claim 1, wherein said insulating film is made of an organic insulating film material containing a silicon compound.

5. A liquid crystal display device according to claim 1, wherein said thin film member comprises color filters of a plurality of filters colored in different colors.

6. A liquid crystal display device according to claim 5, wherein said color filters comprise a plurality of striped color filters including red filters, green filters and blue filters alternately arranged.

7. A liquid crystal display device according to claim 1, wherein said insulating film has said plurality of insulation layers formed by sequentially laminating a same film forming material.

8. A method of manufacturing a liquid crystal display device comprising:
 a first step of forming at least one first electrode on a first substrate and forming an aligning film for covering said at least one first electrode;
 a second step of forming a thin film member on a second substrate;
 a third step of forming an insulating film including a plurality of insulation layers arranged one on the other, which are formed on said second substrate to cover said thin film member formed on said second substrate, and said plurality of insulation layers each including respective outer peripheries which have sub-areas being different from each other in their areas so that a resultant peripheral surface of said insulating film is formed to be shaped as a staircase including a plurality of steps, the sub-areas of said insulation layers of said insulating film successively changing in area from said other substrate toward said one of said substrates;
 a fourth step of forming a plurality of second electrodes to oppose said at least one first electrode and an aligning film to cover said second electrodes on said second substrate on which said insulating film has been formed; and
 a fifth step of hermetically binding together said first and second substrates with a predetermined gap interposed therebetween by means of a sealing member, said at least one first electrode and said second electrodes being opposed to each other, and for filling a liquid crystal material into said gap.

9. A method of manufacturing a liquid crystal display device according to claim 8, wherein said third step includes a sub-step of sequentially laminating said plurality of insulation layers.

10. A method of manufacturing a liquid crystal display device according to claim 9, wherein said sub-step for forming said multi-layered insulating film includes a transferring step for transferring a film material by using a transfer member on said second substrate, said transfer member having a projecting pattern which corresponds to a predetermined applying area on said second substate, and said film material being evenly attached on said projecting pattern before it is transferred, and said transferring step is conducted by using transfer members having projecting patterns which are different from each other in response to said applied films of said insulation layers.

11. A method of manufacturing a liquid crystal display device according to claim 8, wherein said third step includes a sub-step of laminating said plurality of insulation layers having progressively decreasing surface areas to form a multi-layered insulating film a stepped outer peripheral end surface.

12. A method of manufacturing a liquid crystal display device according to claim 8, wherein said third step includes a sub-step of laminating a plurality of insulation layers having progressively increasing surface areas to form a multi-layered insulating film a stepped outer peripheral end surface.

13. A method of manufacturing a liquid crystal display device according to claim 8, wherein said third step comprises a sub-step including an applying step of forming an insulation layer by applying a film material to form an applied film and then further applying at least one time the same film material used in the first applying on an identical surface area on which the film material has been applied by the first applying operation, and a hardening step for drying said two applied film material for hardening, the second application being conducted before the drying and hardening of the film material of the preceding application.

14. A method of manufacturing a liquid crystal display device according to claim 13, wherein said third step further includes a leaving step for leaving the two applied films, which are applied at two times with a film material and are not dried, for a predetermined period of time between said applying step and said hardening step.

15. A method of manufacturing a liquid crystal display device according to claim 13, wherein said applying step includes a transferring step for transferring a film material by using a transfer member on said second substrate, said transfer member having a projecting pattern which corresponds to a predetermined applying area on said second substate, and said film material being evenly attached on said projecting pattern before it is transfered.

16. A method of manufacturing a liquid crystal display device according to claim 8, wherein said third step includes a sub-step for sequentially laminating a plurality of said insulation layers made of a same film material.

* * * * *